(12) United States Patent
Jones

(10) Patent No.: US 8,752,289 B2
(45) Date of Patent: Jun. 17, 2014

(54) METHOD OF MANUFACTURING A REINFORCING EDGE FOR A TURBO MACHINE AEROFOIL

(75) Inventor: Richard M. Jones, Colne (GB)

(73) Assignee: Rolls-Royce PLC, London (GB)

( * ) Notice: Subject to any disclaimer, the term of this patent is extended or adjusted under 35 U.S.C. 154(b) by 737 days.

(21) Appl. No.: 12/832,584

(22) Filed: Jul. 8, 2010

(65) Prior Publication Data

US 2011/0023301 A1    Feb. 3, 2011

(30) Foreign Application Priority Data

Jul. 28, 2009   (GB) .................................. 0913061.8

(51) Int. Cl.
*B23P 15/02*   (2006.01)

(52) U.S. Cl.
USPC ........................................ 29/889.71; 228/190

(58) Field of Classification Search
CPC ................................. B23P 15/04; B23K 20/00
USPC ............. 29/889.71, 889.7; 416/224; 228/160, 228/190, 194
See application file for complete search history.

(56) References Cited

U.S. PATENT DOCUMENTS

| | | | | |
|---|---|---|---|---|
| 3,627,444 A | * | 12/1971 | Lentz | ........................... 416/96 R |
| 4,010,530 A | * | 3/1977 | Delgrosso et al. | .......... 29/889.71 |
| T102,401 I4 | * | 11/1982 | Toth | ......................... 29/898.062 |
| 5,141,400 A | * | 8/1992 | Murphy et al. | ........... 416/204 A |
| 5,240,376 A | | 8/1993 | Velicki | |
| 5,261,159 A | * | 11/1993 | Yasuda et al. | ............ 29/898.066 |
| 6,279,228 B1 | | 8/2001 | Kobayashi et al. | |
| 6,681,488 B2 | * | 1/2004 | Marando | ....................... 29/897.2 |
| 6,739,049 B2 | * | 5/2004 | Nicholson | .................. 29/889.72 |
| 2005/0278950 A1 | * | 12/2005 | Despreaux et al. | ........ 29/889.71 |

FOREIGN PATENT DOCUMENTS

GB     1 593 378     7/1981

OTHER PUBLICATIONS

British Search Report issued in British Patent Application No. 0913061.8, dated Sep. 21, 2009.

* cited by examiner

*Primary Examiner* — Jacob Cigna
(74) *Attorney, Agent, or Firm* — Oliff PLC

(57) ABSTRACT

A method of manufacturing a reinforcing edge for attachment to a turbo machine aerofoil, wherein the reinforcing edge comprises a relatively thick nose portion contoured for fitting along the edge of the turbo machine aerofoil, and a pair of opposing, relatively thin, tail portions for overlapping the suction surface and pressure surface respectively of the aerofoil, the method comprising: pressure forming a predefined hollow workpiece under fluid pressure from a respective pre-form, the hollow workpiece incorporating the reinforcing edge; and cutting out said reinforcing edge from the hollow workpiece, wherein the pre-form is created by bonding a pair of relatively thin metal sheets to opposite faces of a relatively thick inner plate or bonded stack of inner plates, the inner plate or stack of inner plates having an opening which defines a closed cavity between the metal sheets for introducing said fluid pressure, each tail portion of the reinforcing edge being constituted by part of a respective one of the relatively thin metal sheets, and the nose portion of the reinforcing edge being constituted by a part of the inner plate or stack of inner plates running along one edge of the cavity.

1 Claim, 4 Drawing Sheets

METHOD OF MANUFACTURING A REINFORCING EDGE FOR A TURBO MACHINE AEROFOIL

The present invention relates to a method of manufacturing a reinforcing edge for attachment to a turbo machine aerofoil, such as a blade. The reinforcing edge may in particular be a leading edge of the turbo machine aerofoil, but could alternatively be a trailing edge of the turbo machine aerofoil.

For example, for certain turbo machine fan blades, particularly those formed from composite materials, it is desirable to reinforce the leading edge of the blade, which otherwise may suffer damage caused by the high mechanical stresses which occur in operation of the blade.

One way of reinforcing the edge of such a blade is to provide a separate reinforcing edge, which is then fitted along the leading edge of the blade. This method allows for the use of stress-resistant materials such as titanium to form the leading edge, but still allows the use of relatively light composite materials to form the body of the blade.

By way of example, a typical form of reinforcing edge for a 'swept' fan blade is illustrated in FIGS. 1a to 1d, in which:

FIG. 1a is a side on view along the length of the reinforcing edge 1;

FIG. 1b is a cross-section taken along the line A-A in FIG. 1a;

FIG. 1c is a cross-section taken along the line B-B in FIG. 1a; and

FIG. 1d is a cross-section taken along the line C-C in FIG. 1a.

Referring to FIG. 1a, the reinforcing edge 1 comprises a relatively thick nose portion 3 and a pair of opposing, relatively thin tail portions 5 and 7.

Viewed side-on in FIG. 1a, the shape of the leading edge is characterised by a series of swept contour lines: swept line A running along the front of the nose 3, swept line B running along the rear of the nose 3, swept line C running along the edge of the tail portion 5 and swept line D running along the edge of the tail portion 7. The reinforcing edge 1 is further characterised by a variable "stagger angle" along its length (measured relative to a nominal centreline CL), ranging from a relatively shallow stagger angle θ (FIG. 1b) through an intermediate stagger angle α (FIG. 1c) to a relatively steep stagger angle β (FIG. 1d).

In this example, a relatively simple aerofoil has been used, displaying swept characteristics. Other embodiments may include aerofoils with hade or lean to their profiles. Likewise, the example given is of a blade; but in other embodiments the aerofoil may be a stator, such as an outlet guide vane (OGV) or front frame vane.

In use, the leading edge of the swept fan blade is slotted in between the tail portions 5 and 7 with the leading edge of the fan blade fitting snugly along the rear of the nose portion 3 (characterised by the contour line B). The nose portion 3 thus runs along the leading edge of the fan blade in order to protect the leading edge of the fan blade, whilst the tail portions 5 and 7 overlap the pressure and suction surfaces of the fan blade in order to reduce aerodynamic loss.

Traditionally, separate reinforcing edges for fan blades have been manufactured by machining the reinforcing edge from starting stock, for example a "close-to-size" forging. However, the complex shape of many reinforcing edges, as exhibited in FIG. 1, makes accurate machining difficult, time-consuming and costly. Machining the relatively thin tail portions of the reinforcing edge, which may have a thickness of around 1 mm, is particularly difficult. The problem of machining a tail portion can be overcome by pre-forming the tail portions and subsequently welding the tail portions to a machined nose portion, but forming the tail portions separately adds complexity to the manufacturing process. There are also quality issues surrounding the welding of the tail portions to the machined nose portion.

More recently, reinforcing edges have been manufactured by cutting them out of predefined, hollow metal workpieces which have been superplastic formed from an initial metal pre-form. One such manufacturing process is disclosed in US2005/0278950. A problem with this type of method is that significant machining is still required in order to arrive at the initial pre-form, and any resulting quality issues in producing the pre-form may then be carried through the superplastic forming process and into the finished reinforcing edge. The superplastic forming process also tends to be relatively slow.

DETAILED DESCRIPTION

It is an object of the present invention to seek to provide an improved method for manufacturing a reinforcing edge for attachment to a turbo machine blade.

According to the present invention, there is provided a method of manufacturing a reinforcing edge for attachment to a turbo machine blade, wherein the reinforcing edge comprises a relatively thick nose portion contoured for fitting along the edge of the turbo machine blade, and a pair of opposing, relatively thin, tail portions for overlapping the suction surface and pressure surface respectively of the turbo machine blade, the method comprising:

pressure forming a predefined hollow work-piece under gas pressure from a respective pre-form, the hollow work-piece incorporating the reinforcing edge; and cutting out said reinforcing edge from the hollow work-piece, wherein the pre-form is created by bonding a pair of relatively thin metal sheets to opposite faces of a relatively thick inner plate or bonded stack of inner plates, the inner plate or stack of inner plates having an opening which defines a closed cavity between the metal sheets for introducing said gas pressure, each tail portion of the reinforcing edge being constituted by part of a respective one of the relatively thin metal sheets, and the nose portion of the reinforcing edge being constituted by a part of the inner plate or stack of inner plates running along one edge of the cavity.

The predefined hollow work-piece may incorporate an additional reinforcing edge comprising a pair of relatively thin tail portions constituted by a remaining part of the metal sheets, and a relatively thick nose portion, constituted by a part of the inner plate or stack of inner plates running along an opposite edge of the cavity, the method further comprising cutting out the additional reinforcing edge from the hollow work-piece to obtain two reinforcing edges from the single, hollow work-piece.

The cavity may be filled with a close fitting insert for resisting collapse of the cavity or distortion of said edges of the cavity. In an embodiment of the invention, the opening is formed by cutting away a section of the inner plate or stack of inner plates and the cut away section is used as said insert inside the cavity.

The, or each, reinforcing edge may be cut from the hollow workpiece using a laser or water jet, and the insert may be retained inside the hollow workpiece during said cutting for preventing through penetration of the workpiece by the laser or water jet.

The bonding of the thin metal sheets to the inner plate or stack of inner plates may be via diffusion bonding.

The method may comprise profile grinding a taper in the metal sheets, prior to bonding to the inner plate or stack inner plates, for forming a respective taper in said tail portions of the reinforcing edge.

Figure 1A:
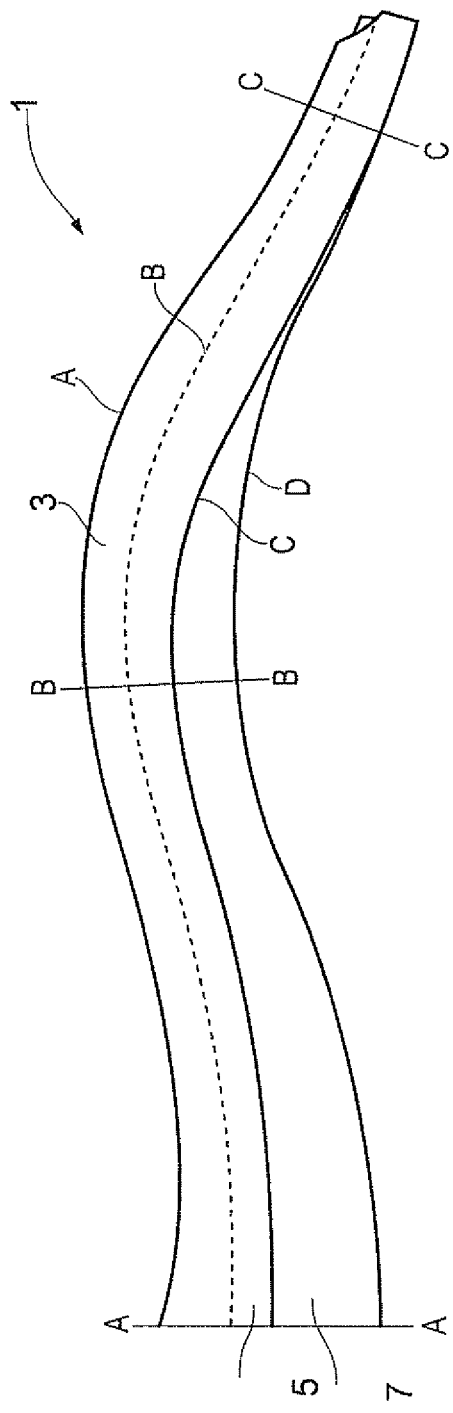
FIGS. 1a to 1d illustrate a reinforcing edge for a 'swept' fan blade.
Figure 1D:
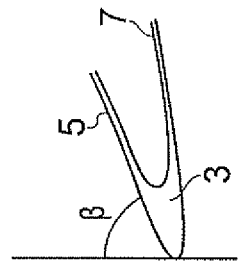
Figure 1C:
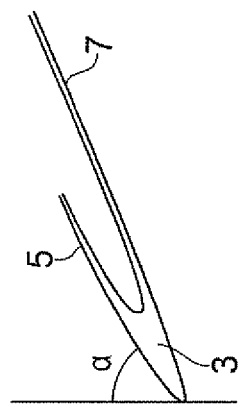
Figure 1B:
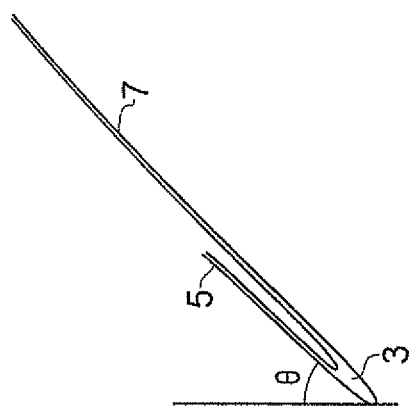
Figure 2A:
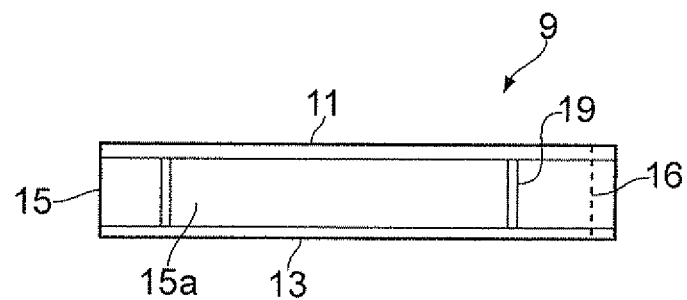
FIGS. 2a and 2b illustrate, respectively, a side view and corresponding plan view of a pre-form assembly for use in manufacturing the reinforcing edge in FIGS. 1a to 1d.
Figure 2B:
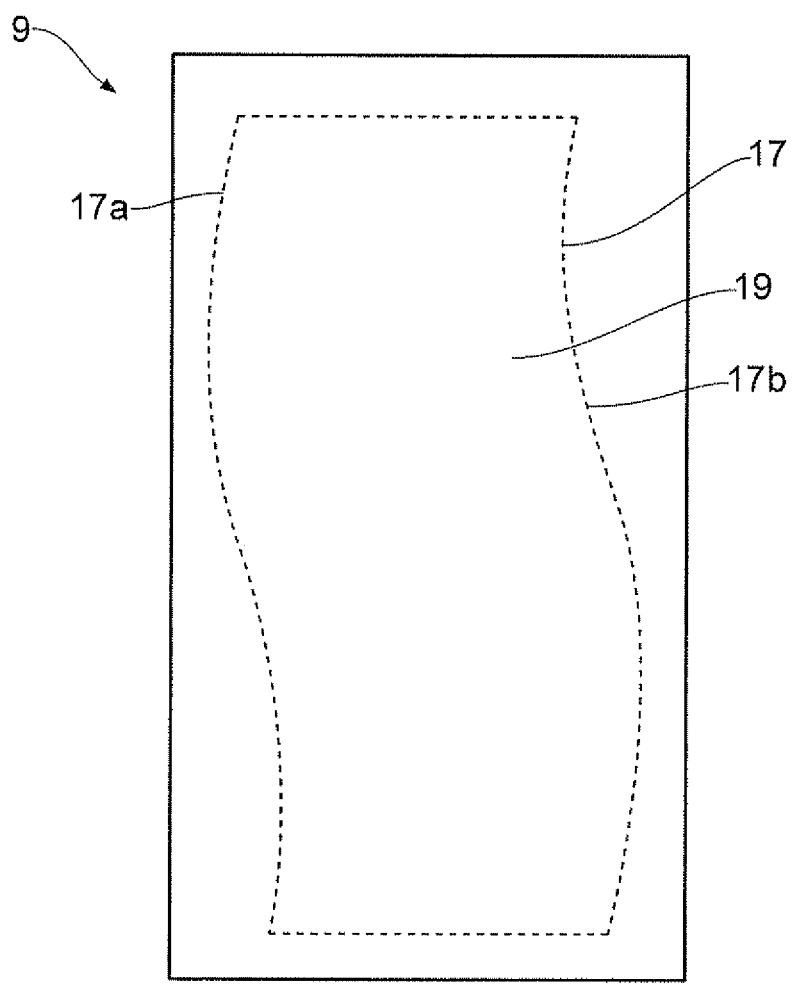
Figure 3:
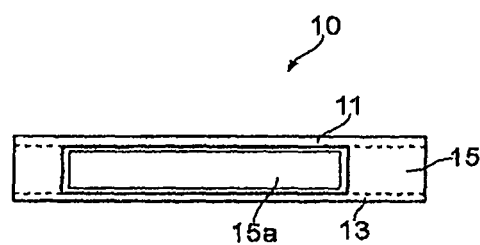
FIG. 3 illustrates the resulting pre-form created by bonding the pre-form assembly shown in FIGS. 2a and 2b.
Figure 4:
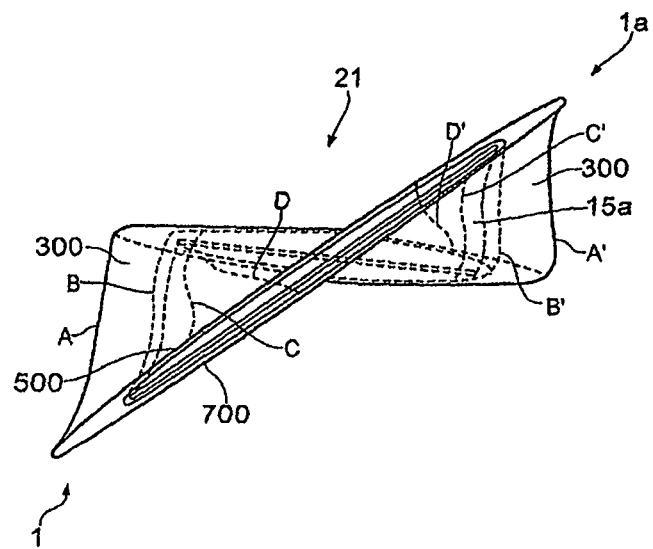
FIG. 4 illustrates a hollow work-piece pressure formed from the pre-form in FIG. 3.
Figure 5:
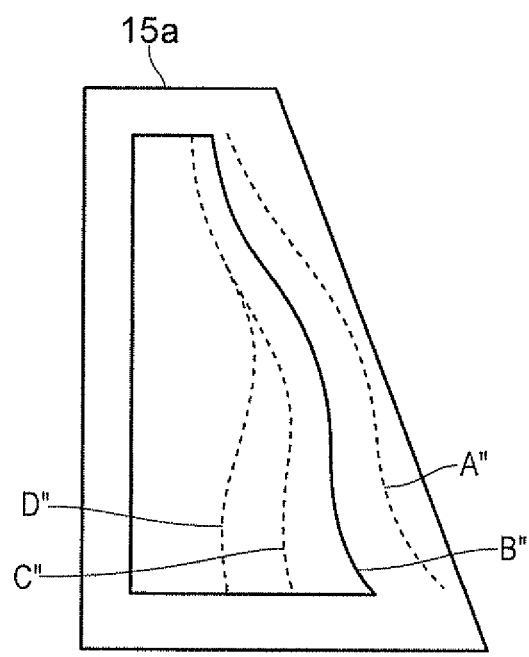
FIG. 5 illustrates an alternative pre-form for use in manufacturing the reinforcing edge in FIGS. 1a to 1d.

Embodiments of the invention will now be described with reference to FIGS. 1a to 1d and the remaining Figures, in which:

FIGS. 2a and 2b show, respectively, a side view and corresponding plan view of a pre-form assembly for use in manufacturing the reinforcing edge in FIGS. 1a to 1d;

FIG. 3 shows the resulting pre-form created by bonding the pre-form assembly shown in FIGS. 2a and 2b;

FIG. 4 shows a hollow work-piece pressure formed from the pre-form in FIG. 3; and FIG. 5 shows an alternative pre-form for use in manufacturing the reinforcing edge in FIGS. 1a to 1d.

For convenience, the method is described with reference to the specific form of reinforcing edge illustrated in FIGS. 1a to 1d.

In overview, the method comprises producing a pre-form, pressure forming a predefined hollow work-piece from the pre-form, the hollow work-piece being predefined to incorporate the external form of the reinforcing edge, and cutting out the reinforcing edge from the hollow workpiece. A finishing process may be carried out on the reinforcing edge to obtain the finished component, if necessary.

In this context "pressure forming" is intended to cover any process by which the hollow workpiece is formed at least in part by inflating and plastically deforming the pre-form under fluid pressure. The fluid may be gas or liquid. The term "pressure forming" therefore includes, but is not limited to, a superplastic forming method such as the one described generally in EP1338353A. The work-piece need not be formed entirely by inflating and plastically deforming the pre-form; for example, the nose portion may be finished by a follow-up adaptive machining step.

Pressure forming of the hollow work-piece may be carried out using a suitable die cavity, configured according to the pre-defined shape of the hollow work-piece, and the pre-defined shape of the hollow work-piece itself may be determined from a computer-model of the external form of the desired reinforcing edge. Prior to pressure forming of the hollow workpiece, the pre-form may be twisted and/or bent so that it better approximates the shape of the die cavity.

In order to reduce the amount of initial machining required to create the pre-form, the pre-form is produced by bonding a pair of relatively thin metal sheets to opposite faces of a relatively thick inner plate or bonded stack of inner plates. The metal sheets may be bonded to the inner plate using a diffusion bonding process, with the metal sheets and inner plate initially being held together as a pre-form assembly prior to the diffusion bonding process using a suitable intermediate retaining means.

The inner plate or stack of inner plates has an opening which defines a closed cavity between the metal sheets; this closed cavity may then be used to introduce the gas pressure required for pressure forming of the hollow workpiece from the pre-form, with the tail portion of the reinforcing edge being constituted by part of a respective one of the relatively thin metal sheets, and the nose portion of the reinforcing edge being constituted by a part of the inner plate or stack of inner plates running along one edge of the cavity. In the case where the tail portions of the final reinforcing edge are required to be tapered, it may be desirable to pre-grind the metal sheets before diffusion bonding to the inner plate or stack of inner plates to form the pre-form.

The metal sheets and the nose portion (or inner plate stack) may be from the same material or from different grades of similar material; and if different materials are used this may dictate the type of bonding that is suitable. It may be desirable to use a (more expensive) impact tolerant, erosion resistant material for the pressure surface, which in use is more likely to be subject to impacts from small particles, and to use a cheaper material for the suction surface.

A suitable pre-form assembly 9 is shown in FIGS. 2a and 2b, in this case comprising a pair of relatively thin metal sheets 11 and 13 held against opposite faces of just a single, relatively thick inner plate 15 by a conventional nail weld 16 (the nail weld 16 is illustrated only very schematically, in FIG. 2a).

An opening 17 is cut from the inner plate 15 to form a closed cavity 19 between the relatively thin metal sheets 11 and 13. Referring to FIG. 2b, opposite edges 17a, 17b of the opening 17 are contoured to match the inner contour line B of the nose portion 3 in the reinforcing edge 1 (FIG. 1).

The cut-out section 15a of the inner plate 15 is included in the pre-form assembly 9 as a close fitting insert which effectively fills the closed cavity between the relatively thin metal sheets 11 and 13.

In order to form the pre-form from the pre-form assembly 9, the relatively thin metal sheets 11 and 13 are diffusion bonded to the inner plate 15 using a suitable diffusion bonding process (the nail weld 16 thus acts as an intermediate retaining means for the pre-form assembly 9, prior to diffusion bonding of the metal sheets 11, 13 to the inner plate 15).

To prevent diffusion bonding of the metal sheets 11 and 13 to the cut-out section 15a, the cut-out section 15a is masked using a spray or dip-coating process (prior to insertion back into the cut-out opening 17).

The resulting pre-form 10 is shown in FIG. 3. The pre-form 10 has the same general configuration as the pre-form assembly 9, with the cut-out section 15a forming a close-fitting insert within the closed cavity 19 between the relatively thin metal sheets 11 and 13, the latter having been largely consolidated with the inner plate 15 by the diffusion bonding process.

One or more inflation points (not illustrated) is provided in either or both of the metal sheets 11, 13 for injecting gas into the cavity 19 in the pre-form 10, and the pre-form 10 is pressure-formed into a pre-defined hollow work-piece by inflating the cavity 19 under gas pressure and plastically deforming the pre-form 10, for example using a suitable die cavity.

The insert 15a acts as a strengthening rib for preventing collapse or distortion of the closed cavity during diffusion bonding, twisting, bending and/or pressure forming of the pre-form 10.

The function of the insert 15a as a strengthening rib is evident from FIG. 4, which shows the resulting hollow workpiece 21 obtained from the pre-form 10, with the insert 15a retained inside the cavity 19. The inner plate 15 has been pressure formed into a pair of relatively thick, contoured edge portions 300, running along opposite sides 17a and 17b of the opening 17, and the metal sheets 11, 13 have been pressure formed into relatively thin face portions 500, 700 spaced opposite one another on either side of the insert 15a (the thickness of the face portions 500, 700 is greatly exaggerated in FIG. 4, for clarity).

The reinforcing edges 1, 1a are illustrated by the contour lines A, B, C and D in FIG. 4. Thus, the edge portion 300 on the left hand side of the work-piece 21 (as viewed in FIG. 4) incorporates the nose portion 3 of the reinforcing edge 1 and the face portions 500, 700 incorporate the tail portions 5 and 7 of the reinforcing edge 1. A second reinforcing edge 1a is likewise defined on the right hand side of the work piece 21 (as viewed in FIG. 4) by the opposing edge portion 300 and the remaining part of the face portions 500, 700; thus, two reinforcing edges may be cut from the single, hollow workpiece 21.

The reinforcing edges 1, 1a may conveniently be cut from the work-piece 21 using a laser or water jet. During cutting of the face portions 500, 700, it will be appreciated that the insert 15a additionally acts as a sacrificial barrier to prevent through-penetration of the respective laser or water jet (i.e. to prevent impingement of the laser or water jet on the opposing face portion 500, 700 during cutting of a face portion 700, 500).

It will be appreciated, from FIG. 4, that the edge portion 300 (and hence the nose portion 3 of the reinforcing edge 1) is constituted by the inner plate 15 in the initial pre-form assembly, whereas the face portions 500, 700 (and hence the tail portions 5, 7 of the reinforcing edge 1) are constituted by the metal sheets 11, 13 in the initial pre-form assembly. Consequently, by using a parallel plate construction to form the pre-form, it is possible to form a reinforcing edge having a large differential cross-sectional thickness simply by selecting suitable thicknesses for the sheets and plates in the pre-form assembly, significantly reducing the amount of machining required to create the pre-form.

Although the invention has been described with reference to reinforcing edge 1 shown in FIG. 1, it will be appreciated that the method can readily be adapted to form other reinforcing edge profiles.

Replacement sheets used to form the pre-form assembly need not be rectangular and may have any suitable perimeter shape. For example, FIG. 5 shows a trapezoidal inner plate 15a. In this case, the pre-form is suitable only for obtaining a single reinforcing edge (indicated by the contour lines A", B", C" and D").

The invention claimed is:

1. A method of manufacturing a pair of aerofoil reinforcing edges, wherein each reinforcing edge comprises a relatively thick nose portion contoured to fit along the edge of the turbo machine aerofoil, and a pair of opposing, relatively thin, tail portions to overlap a suction surface and pressure surface respectively of the turbo machine aerofoil, the method comprising:
  a first step of creating a pre-from assembly comprising a pair of substantially thin metal sheets held against opposite faces of a substantially thick inner plate, the inner plate including an opening cut to form a closed cavity, the cut-out section of the inner plate being included in the pre-form assembly;
  a second step of creating a pre-form from the pre-form assembly by diffusion bonding, the cut-out section being masked to prevent bonding to the metal sheets;
  a third step of forming a predefined hollow workpiece from the pre-form by superplastic forming, the hollow workpiece incorporating the reinforcing edges; and
  a fourth step of cutting through the metal sheets from opposite sides to form the pair of reinforcing edges from the workpiece, the cut-out section is a sacrificial barrier to prevent through-penetration.

* * * * *